United States Patent [19]

Machida et al.

[11] Patent Number: 4,551,771
[45] Date of Patent: Nov. 5, 1985

[54] METHOD AND APPARATUS FOR RECORDING DIGITAL INFORMATION IN ALTERNATE RECORDING TRACKS

[75] Inventors: Yukihiko Machida, Seki; Kenji Nakano, Ebina; Takao Takahashi, Sagamihara, all of Japan

[73] Assignee: Sony Corporation, Tokyo, Japan

[21] Appl. No.: 375,103

[22] Filed: May 5, 1982

[30] Foreign Application Priority Data

May 14, 1981 [JP] Japan .................................. 56-72461

[51] Int. Cl.$^4$ .......................................... H04N 5/782
[52] U.S. Cl. .................................... 360/19.1; 358/343
[58] Field of Search .................... 360/19.1, 21, 64, 18, 360/32, 39; 358/343

[56] References Cited

U.S. PATENT DOCUMENTS 4,303,950 12/1981 Taniguchi et al. .................. 360/19.1

FOREIGN PATENT DOCUMENTS 1026468 4/1966 United Kingdom .

Primary Examiner—Robert L. Richardson
Attorney, Agent, or Firm—Lewis H. Eslinger; Alvin Sinderbrand

[57] ABSTRACT

Information is digitized, and the digital information signals are used to produce frequency modulated signals the instantaneous frequency of which is a function of the content of the digital information signals. The frequency-modulated signals are recorded in alternate tracks with alternate recording heads having air gaps of different azimuth angles. In one embodiment, the recording heads are the rotary heads of a VTR, and the digital information signals are digital audio signals which are recorded in the same tracks as the usual video signals.

26 Claims, 10 Drawing Figures

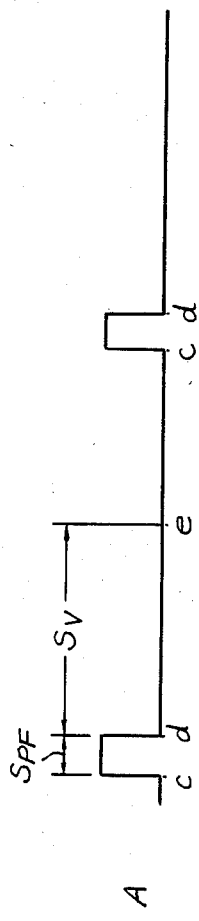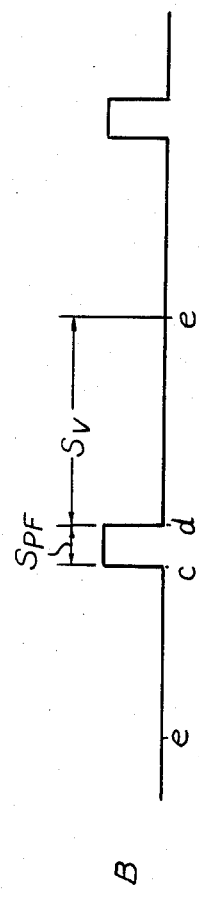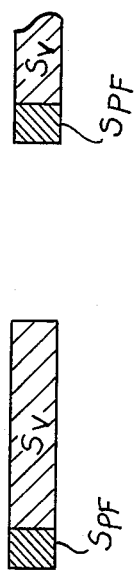
FIG.5A
FIG.5B
FIG.5C
FIG.5D

METHOD AND APPARATUS FOR RECORDING DIGITAL INFORMATION IN ALTERNATE RECORDING TRACKS

BACKGROUND OF THE INVENTION

This invention relates to a method and apparatus for recording digital signals in alternate recording tracks and, more particularly, to a method and apparatus which is particularly adapted for use in a video tape recorder (VTR) in which audio signals are digitized and recorded in the same tracks as the usual video signals.

In a typical VTR, a pair of recording heads are rotatably mounted on a guide drum, such as a rotary guide drum, and are rotated to helically scan successive skewed tracks across a magnetic tape that is transported over the guide drum. In one type of helical scan VTR, the recording heads are diametrically opposed to one another so as to be spaced apart by 180°. As the tape is transported, first one head traces a recording track across the tape and then the other head is positioned to scan a parallel track adjacent to the first track. Thus, the two heads record alternate tracks across the tape.

In the NTSC system, each head records a field of video signals; and the heads rotate at the rate of thirty revolutions per second. Thus, two tracks are recorded during every 360° rotation of the heads. Since the heads rotate at a speed which is greater than the speed at which the tape is transported, the relative head-to-tape speed is sufficient for the high density recording of the video signals. Consequently, even if the tape transport speed is reduced, thereby increasing the overall "recording time" or capacity of a magnetic tape of predetermined length, the recording density remains high.

In order to improve the efficiency at which the recording tape is used, it is desirable to minimize or even eliminate entirely the spacing, or guard bands, between adjacent parallel tracks. In one technique which has been proposed for recording without guard bands, the chrominance component of the video signal is frequency-converted to a relatively low range having a frequency-converted chrominance subcarrier on the order of about 688 KHz, and the luminance component is frequency modulated onto an FM carrier on the order of about 3.5 MHz. The rotary heads which are used to record the alternate tracks have air gaps which exhibit different azimuth angles. Consequently, during a reproducing operation, if a portion of one track that had been recorded by, for example, head A is reproduced by head B, the fact that the reproducing head exhibits a different azimuth angle than was used for recording results in substantial attenuation of the undesired cross talk component that is picked up from the adjacent track. However, this so-called azimuth loss is a function of the frequency of the recorded signal. That is, azimuth loss is more pronounced at higher frequencies than at lower frequencies. Accordingly, although azimuth loss is effective to suppress unwanted cross talk components of the higher frequency FM luminance signal that may be picked up from an adjacent track, it is less effective to suppress unwanted cross talk components in the lower frequency chrominance signal that is picked up from the adjacent track.

Chrominance cross talk components are suppressed by the use of a comb filter in the reproducing circuitry. During recording, the effective chrominance subcarrier frequency in one track differs from the chrominance subcarrier frequency in the next adjacent track. This is achieved, for example, by recording the frequency-converted chrominance component with a subcarrier of constant phase from one line interval to the next in one track, and then reversing the phase at every line interval in the next adjacent track. Upon reproduction, the frequencies of the frequency-converted chrominance components that are picked up from adjacent tracks (i.e. the undesired cross talk components) appear to be interleaved with the frequencies of the frequency-converted chrominance conponents which are reproduced from the track being scanned. By using a comb filter having rejection bands that coincide with the cross talk frequencies, the undesired frequency-converted chrominance components which are picked up from adjacent tracks are attenuated. Thus, color video signals may be recorded and satisfactorily reproduced from adjacent tracks without the need to separate such tracks with guard bands.

In helical scan VTRs of the aforementioned type, the rotary heads are used to record only the video signals in skewed tracks. Audio signals are recorded in a separate track, parallel to the longitudinal edge of the tape and disposed in proximity therewith by a fixed audio recording head. However, if the magnetic tape is transported at a relatively slow speed, the quality of the audio signal which is recorded by the fixed head is not as good as if the tape had been transported at higher speeds.

It is thought that the aforementioned problem of degraded audio signal recording due to the relatively low transport speed of the tape can be avoided, or substantially minimized, if the audio signals are recorded in the very same track as the video signals. For example, a predetermined portion of each track may be dedicated for the recording of audio signals therein. Also, the fidelity with which the audio signals are recorded and reproduced may be improved if such audio signals first are digitized, and the digital audio signals then recorded in the video tracks. However, such recording of the digital audio signals in the video tracks may be faced with the problem of cross talk interference in the event that such tracks are recorded without guard bands. That is, during reproduction, when head A, for example, scans the track that had been recorded either by that same head or a head with an equal azimuth angle, the audio signal that had been recorded in an adjacent track by head B may be reproduced.

As is known, in one typical embodiment of a comb filter, cross talk component rejection is achieved, at least in part, on the recognition of the fact that a video signal, particularly the chrominance component thereof, changes slowly from one horizontal line to the next. That is, the relatively high line-to-line redundancy of video information underlies the implementation of the chrominance component comb filter. Unfortunately, audio signals, and particularly digital audio signals, do not exhibit such line-to-line redundancy. Hence, the typical chrominance component cross talk comb filter would not be successful in rejecting cross talk components of the digital audio signals that are picked up from adjacent tracks.

Also, the digital audio signals generally contain a large number of lower frequency components. These components are not subjected to azimuth loss as are the higher frequency FM luminance components. Accordingly, cross talk rejection of the digital audio signals picked up from adjacent tracks is not expected, even when such cross talk components are reproduced by heads having different azimuth angles than were used to record such components. It is possible, however, to record the digital audio signals as Modified Frequency Modulation (MFM) or Modified Modified Frequency Modulation (M²FM) signals, wherein the recording frequencies are high enough to be subjected to azimuth loss. However, when using MFM or M²FM recording techniques, both the recording system as well as the reproducing system should exhibit uniform frequency characteristics over the entire frequency range from relatively low to relatively high frequencies. This requirement is, however, quite difficult, especially in VTRs wherein the usual equalizer and amplifier circuits in the reproducing section must be of high precision.

OBJECTS OF THE INVENTION

Therefore, it is an object of the present invention to provide an improved method and apparatus for recording digital audio signals in a VTR which overcomes the aforementioned disadvantages and difficulties.

Another object of this invention is to to provide a method and apparatus for recording digital signals in alternate tracks by a pair of rotary heads.

A further object of this invention is to provide a method and apparatus for recording digital signals in adjacent tracks on a record medium, and wherein cross talk interference caused by the reproduction of digital signals from an adjacent track is avoided or at least substantially minimized.

Yet another object of this invention is to provide a method and apparatus for recording digital signals as frequency modulated signals in alternate tracks with alternate recording heads having air gaps of different azimuth angles.

Another object of this invention is to provide a method and apparatus for recording digital audio signals as frequency modulated signals in the same tracks as video signals by rotary transducers.

An additional object of this invention is to provide a method and apparatus for converting digital audio signals into frequency modulated signals and then recording the frequency modulated signals in predetermined portions of skewed tracks on a record medium, such tracks having video signals recorded in the remaining portions thereof.

Various other objects, advantages and features of the present invention will become readily apparent from the ensuing detailed description, and the novel features will be particularly pointed out in the appended claims.

SUMMARY OF THE INVENTION

In accordance with this invention, information is recorded in adjacent tracks on a record medium by digitizing that information to produce digital information signals and then using the digital information signals to produce frequency modulated signals, the instantaneous frequency of which is a function of the content of the digital information signals. The frequency modulated signals are recorded in alternate tracks by alternate recording heads having different azimuth angles.

In accordance with one aspect of this invention, the particular frequency of the frequency modulated signals is a function of whether a respective bit is a binary "1" or a binary "0". Advantageously, a first frequency is produced when the bit is a binary "1" and another frequency is produced when the bit is a binary "0". Preferably, the average or center frequency of the frequency modulated signals is sufficiently high that a signal of one frequency recorded by one head is substantially attenuated due to azimuth loss if reproduced by a playback head having the same azimuth as the other recording head.

In accordance with another aspect of this invention, the digital signals represent audio information, and the frequency modulated signals produced by the digital audio signals are recorded in respective predetermined sections of each track. The remainder of each track has video signals recorded therein. Hence, the same head is used to record both the frequency modulated signals and the video signals in a respective track. As a feature of this aspect of the invention, the digitized audio signals are time-compressed prior to recording.

BRIEF DESCRIPTION OF THE DRAWINGS

The following description, given by way of example, will best be understood in conjunction with the accompanying drawings in which:

FIGS. 5A–5D are timing diagrams which are useful in understanding the manner in which the embodiment shown in FIG. 4 operates;

DETAILED DESCRIPTION OF A PREFERRED EMBODIMENT

Figure 1:
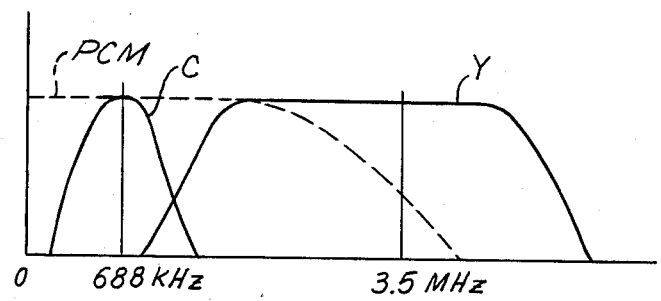
FIG. 1 is a graphical representation of the frequency spectrum of the signals recorded by one type of VTR.

The present invention is particularly adapted to record digital audio signals in the same tracks as video signals by a helical scan VTR of the type having a pair of recording heads. Advantageously, the VTR is of the type which records adjacent, parallel, skewed tracks without guard bands therebetween. As mentioned above, in a VTR of this type, cross talk interference is avoided, or at least minimized, by frequency converting the chrominance component of the color video signal to a relatively lower frequency range, and frequency modulating the luminance component onto a carrier that is well above the range of the frequency-converted chrominance component. FIG. 1 is a graphical representation of the frequency spectrum of such a processed video signal. As shown in FIG. 1, the frequency-converted chrominance component exhibits a center frequency, such as the converted chrominance subcarrier frequency, of about 688 KHz. Also, the center frequency of the luminance component is on the order of about 3.5 MHz. Only relatively small overlap is present between the lower range of the spectrum of the frequency-modulated luminance component and the upper spectrum of the frequency-converted chrominance component.

As is conventional, the frequency-converted chrominance component and the frequency-modulated luminance component are combined, or mixed, and the combined signals are recorded in alternate tracks by alternate recording heads. For example, recording head A records the combined signals in every other track $T_A$, and recording head B records the combined signals in the remaining tracks $T_B$. The azimuth angle of the air gap of head A differs from the azimuth angle of head B. During reproduction, if playback heads A and B are provided with azimuth angles substantially identical to the respective azimuth angles of recording heads A and B, azimuth loss substantially attenuates a cross talk component of the frequency-modulated luminance signal that may be picked up by playback head A from track B, and vice versa.

The phenomenon of azimuth loss is effective to attenuate the higher frequency signals which constitute the frequency-modulated luminance component that may be picked up from adjacent tracks. However, azimuth loss is directly related to the frequency of the reproduced signal. As this frequency is reduced, attenuation due to azimuth loss also is reduced. Hence, there is little attenuation due to azimuth loss when playback head A picks up the frequency-converted chrominance component that had been recorded in track B. However, the effective chrominance subcarrier frequencies that are recorded in tracks A and B differ from each other such that a comb filter may be used to reject undesired cross talk components. In such a comb filter, the null frequency values coincide with the frequencies of the signals picked up from adjacent tracks. Hence, the use of such a comb filter serves to remove the undesired cross talk components of the frequency-converted chrominance signal.

Such a VTR which employs azimuth loss and comb filters in order to record composite color video signals in successive, adjacent tracks without guard bands therebetween is described in, for example, U.S. Pat. No. 4,007,482.

The present inventor has proposed that, in a VTR of the aforedescribed type, the audio signals may be recorded in the very same tracks as the video signals. Typically, the audio signals are recorded in a separate, longitudinal track by a fixed recording head. However, according to this proposal, the audio signals may be digitized, and the digital audio signals may be recorded by the same rotary recording heads as are used to record the video signals. Such digital audio signals are recorded in a predetermined portion of each track, either preceding or following the video signals in that track. However, since the digital audio signals generally contain very low frequency components, such digital audio signals, which also are referred to as PCM audio signals, exhibit the frequency spectrum illustrated as the broken line in FIG. 1.

Because of the low frequency components included in the recorded digital audio signals, the phenomenon of azimuth loss is not successful in minimizing cross talk interference that may arise when playback head A picks up digital audio signals that have been recorded in track B. Furthermore, the use of comb filters to remove cross talk components of the digital audio signals is not successful. Even if the digital audio signals are recorded in some type of frequency modulation format, such as MFM or $M^2FM$, as mentioned above, thus raising the frequencies of the digital signals to the level wherein azimuth loss is effective, the requirement of uniform frequency characteristics over a very large frequency range for such frequency-modulated digital signals is difficult to implement. That is, the usual equalizer and amplifier circuitry in the reproducing section of a VTR must be constructed with high precision, and it is difficult to maintain such high precision over the very large frequency range exhibited by the frequency-modulated digital signals. The present invention, described below, overcomes these difficulties.

Figure 2:
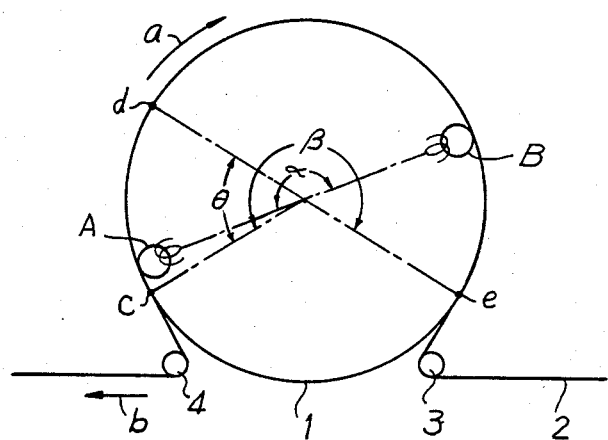
FIG. 2 is a schematic representation of the rotary heads of a VTR which scan successive traces across a track.

Referring to FIG. 2, there is a schematic illustration of one embodiment of the rotary head assembly that may be used to record the digital audio signals in the same tracks by the same heads as are used for the recording of video signals. Heads A and B may be, for example, combined recording/reproducing heads and are mounted on a rotary portion of a conventional guide drum 1 of a VTR. Heads A and B are diametrically opposed from one another and separated by 180°. Drum 1, and heads A and B, rotate in the direction illustrated by arrow a; and a magnetic tape 2 is helically guided by guide members 3 and 4 about a peripheral portion of guide drum 1. Tape 2 is transported in the direction illustrated by the arrow b. Tape 2 contacts guide drum 1 to subtend an angle from point c to point e. It is appreciated that this angle is greater than the 180° separation between heads A and B. As a numerical example, this angle subtended by tape 2 from point c to point e is equal to 210°.

Figure 3:
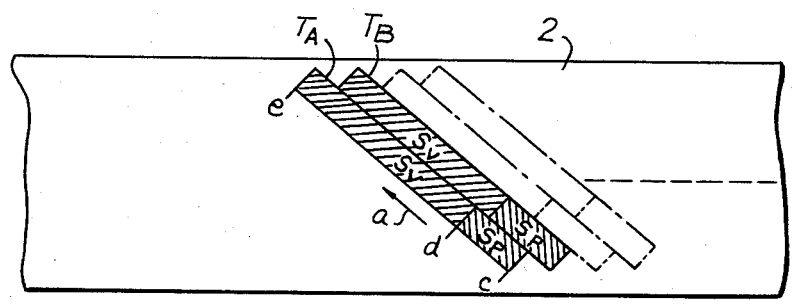
FIG. 3 is a schematic representation of the tracks which are recorded on the record tape by the VTR shown in FIG. 2.

In operation, when head A rotates to point c, it is supplied with digital audio signals, preferably in frequency-modulated format, which digital audio signals are recorded until head A arrives at point d. Thereafter, head A is supplied with video signals for recording while the head rotates from point d to point e. Similarly, when head B rotates to point c, digital audio signals are supplied thereto for recording until head B rotates to point d. Thereafter, head B is supplied with video signals which are recorded on tape 2 from point d to point e. FIG. 3 is a schematic illustration of tracks $T_A$ and $T_B$ which are recorded on tape 2 by heads A and B, respectively. As shown, when head A rotates from point c to point d, digital audio signals $S_p$ are recorded. Thereafter, head A is changed over to be supplied with video signals $S_v$ which are recorded from point d to point e. It is seen that, while head A rotates from point c to point d, for example, head B is in the process of rotating to point e. Thus, heads A and B both are in contact with tape 2 concurrently during this interval. While head A records digital audio signals $S_p$, head B is recording video signals. Accordingly, for the angular interval $\theta$ illustrated in FIG. 2, both heads record concurrently, one head recording audio information and the other recording video information on separate tracks. In the example described herein, $\theta = 30°$.

Figure 4:
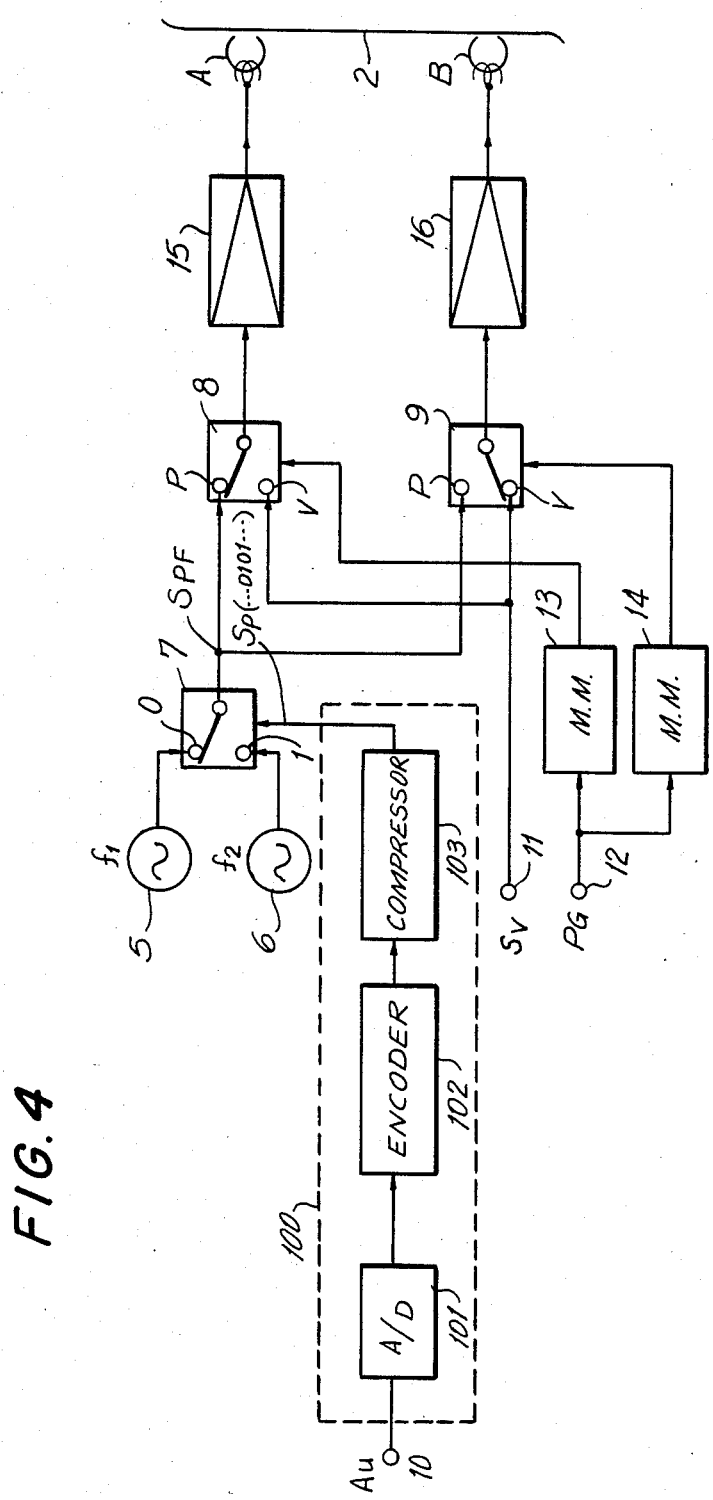
FIG. 4 is a block diagram one one embodiment of the present invention.

Turning now to FIG. 4, there is illustrated one embodiment of the present invention by which digital audio signals and video signals are recorded in the same tracks by the same recording heads in a common recording system. A source of audio signals (not shown) is coupled to an input terminal 10, and a source of video signals (not shown) is coupled to an input terminal 11. An analog-to-digital converter 100 is connected to audio input terminal 10 and is adapted to digitize the audio signals to produce encoded digital signals representative thereof. For example, the encoded digital signals may be PCM signals; each PCM signal including a plurality of binary "1"s and "0"s representing a respective sample of the input audio signal. The output of analog-to-digital converter 100 is coupled to a frequency modulator which is diagrammatically illustrated as being comprised of first and second sources 5 and 6 of frequencies $f_1$ and $f_2$, respectively, coupled to a switching circuit 7 which is adapted to select the signal generated by one or the other of the frequency sources in response to the digitized audio signals supplied thereto. For example, switching circuit 7 is responsive to each binary "0" included in the digitized audio signal to select frequency source 5 so as to provide the frequency $f_1$; and is responsive to each binary "1" included in the digitized audio signal to select frequency source 6 so as to provide the frequency $f_2$. It is appreciated, therefore, that switching circuit 7 is responsive to the content of the digitized audio signal to select the appropriate frequency $f_1$ or $f_2$. Switching circuit 7 may be thought of as a frequency shift keying circuit for modulating a binary "0" with the frequency $f_1$ and a binary "1" with the frequency $f_2$.

The output of the frequency modulator, or switching circuit 7, is coupled to an input P of each of changeover switches 8 and 9. Each of these change-over switches also includes an input V coupled to input terminal 11 to receive the video signals supplied thereto from the source of video signals. Each change-over switch 8 and 9 is responsive to a switch control signal supplied thereto so as to couple its P input or its V input to the output thereof. For example, each change-over switch is adapted to couple its P input to its output in response to a positive pulse level, and to couple its V input to its output in the absence of this positive pulse level. A pulse generator, such as a monostable multivibrator 13, is adapted to supply a change-over pulse to change-over switch 8; and a similar pulse generator, such as monostable multivibrator 14, is adapted to supply a change-over pulse to change-over switch 9. The outputs of change-over switches 8 and 9 are coupled to recording heads A and B via amplifiers 15 and 16, respectively. As illustrated, heads A and B are adapted to contact tape 2 so as to record successive, adjacent, parallel tracks $T_A$ and $T_B$, as shown in FIG. 3.

Monostable multivibrators 13 and 14 are coupled in common to an input terminal 12 adapted to receive a position pulse PG supplied thereto by a position pulse generator (not shown). In particular, the usual rotary drive shaft coupled either to rotary guide drum 1 or to rotary heads A and B (FIG. 2) may be provided with a detecting circuit adapted to generate a position pulse PG when the heads rotate to a predetermined position. As an example, the rotary drive shaft may include a magnetic element which passes a suitable pick-off coil when head A rotates to position c. Such a position pulse PG is supplied to input terminal 12 to trigger monostable multivibrators 13 and 14. For example, monostable multivibrator 13 may be triggered so as to produce an output pulse of predetermined duration, this pulse terminating when head A rotates to position d. Monostable multivibrator 14 may include a suitable delay circuit or series-connected monostable multivibrator circuits so as to produce a similar output pulse when head B rotates to position c. The output pulse produced by monostable multivibrator 14 is of a predetermined time duration such that it terminates when head B rotates to position d.

Analog-to-digital converter 100 is formed of an A/D converter 101, an encoder 102 and a time compressor 103. A/D converter 101 may include a sampling circuit to sample the input analog audio signal at successive sampling times, and a quantizing circuit for quantizing each sample and for converting same to a digital representation. In this regard, A/D converter 101 may be of conventional construction.

Encoder 102 is adapted to encode the digital signal produced by A/D converter 101 in a desirable digital code. For example, encoder 102 may include a PCM encoder for producing a PCM audio signal in response to each digitized audio signal sample. Of course, if desired, encoder 102 may encode each digitized sample into any other desirable digital code. Time compressor 103 is adapted to compress the time base of the encoded digital audio signal. For example, the time compressor may include a memory circuit into which the encoded digital audio signals are written at a first rate and from which the encoded digital audio signals which are temporarily stored therein are read at a second, faster rate. Time compressor 103 may include at least two such memory devices so that digital audio signals may be written into one while temporarily stored digital audio signals may be read out of the other. The time compressed digital audio signals are supplied to switching circuit 7 whereat they are used to produce the frequency modulated signals $S_{pf}$ mentioned above. That is, switching circuit 7 provides a signal with the frequency $f_1$ in response to each binary "0" supplied thereto from time compressor 103, and provides a signal with the frequency $f_2$ in response to each binary "1" supplied thereto from the time compressor. In this manner, frequency modulated signals $S_{pf}$ are supplied to change-over switches 8 and 9 as a function of the digital audio signals produced by analog-to-digital converter 100. For example, if the digital audio signal includes the binary sequence [ . . . 0110 . . . ], switching circuit 7 produces the frequency modulated signal $S_{pf}$ [ . . . $f_1 f_2 f_2 f_1$ . . . ].

In one embodiment of the apparatus illustrated in FIG. 4, $f_1 = 2.8$ MHz and $f_2 = 5.6$ MHz. From the frequency spectrum illustrated in FIG. 1, it is appreciated that these frequencies $f_1$ and $f_2$ which are used to represent the digital audio signals are sufficiently high so as to be subjected to azimuth loss. Consequently, if the frequency-modulated digital audio signal $S_{pf}$ is recorded in track $T_A$ by head A, any cross talk component of the frequency-modulated digital audio signal that may be picked up from, for example, track $T_B$ when track $T_A$ is scanned will be substantially attenuated, provided that the playback head which scans track $T_A$ exhibits the same azimuth angle as the recording head which had been used to record that track. Of course, it is assumed that the frequency-modulated digital audio signals which are recorded in track $T_B$ had been recorded by a recording head whose azimuth angle differed from the azimuth angle of the recording head used to record track $T_A$.

Referring to FIGS. 5A-5D, there is illustrated the timing relationship between the change-over switch pulses produced by monostable multivibrators 13 and 14 and the signals supplied to heads A and B, respectively. As mentioned above, monostable multivibrator 13 generates the change-over switch pulses shown in FIG. 5A in response to the position pulses PG that are produced when head A, for example, rotates to position c. This change-over switch pulse is of predetermined time duration, as established by the time constant of the monostable multivibrator, and terminates at the time when head A rotates to position d. Thus, the time duration of the change-over switch pulse shown in FIG. 5A is equal to the time required for rotary head A to scan the arcuate path defined by the angle θ shown in FIG. 2.

Change-over switch 8 is responsive to the change-over switch pulse supplied thereto from monostable multivibrator 13 to supply the frequency-modulated digital audio signals $S_{pf}$ to head A. Hence, and as shown in FIG. 5C, the frequency-modulated digital audio signals $S_{pf}$ are recorded by head A over the arcuate segment θ while the head advances from position c to position d. At that time, the change-over switch pulse terminates (FIG. 5A), and change-over switch 8 now couples the video signals $S_v$ to head A. As illustrated in FIG. 5C, these video signals $S_v$ now are recorded by head A as the head rotates from position d to position e.

As mentioned above, the position pulse PG which triggers monostable multivibrator 13 also is used to trigger monostable multivibrator 14. The latter is triggered to produce the change-over switch pulse shown in FIG. 5B at the time that head B rotates to position c. Preferably, the change-over switch pulse produced by monostable multivibrator 14 (FIG. 5B) exhibits the same time duration as the change-over switch pulse produced by monostable multivibrator 13 (FIG. 5A). Thus, change-over switch 9 is responsive to the change-over switch pulse supplied thereto by monostable multivibrator 14 to couple the frequency-modulated digital audio signals $S_{pf}$ to head B during the time duration of this change-over switch pulse. Consequently, the frequency-modulated digital audio signals $S_{pf}$ are recorded by head B as the head rotates from position c to position d, as shown in FIG. 5D. It is appreciated that, while head B is supplied with and records the frequency-modulated digital audio signals, head A is supplied with and records the video signals $S_v$. Hence, the arcuate length of each record track recorded by heads A and B is greater than 180°; and is equal to 180°+θ.

At the termination of the change-over switch pulse produced by monostable multivibrator 14, which is timed to coincide with the rotation of head B to position d, change-over switch 9 operates to couple the video signals $S_v$ to head B. Thus, and as shown in FIGS. 5B and 5D, the video signals $S_v$ are recorded by head B from position d to position e. The foregoing operation is repeated.

It is seen that heads A and B record alternate tracks on tape 2. In the example described herein, frequency-modulated digital audio signals are recorded at a predetermined portion of each track, and the remainder of that track has video signals $S_v$ recorded therein. Although the frequency-modulated signals have been described as being recorded in the beginning portion of each track, such as during the first 30° of rotation of each head, it is appreciated that, if desired, the frequency-modulated digital audio signals may be recorded in the final, or terminating portion of each track.

Figure 6:
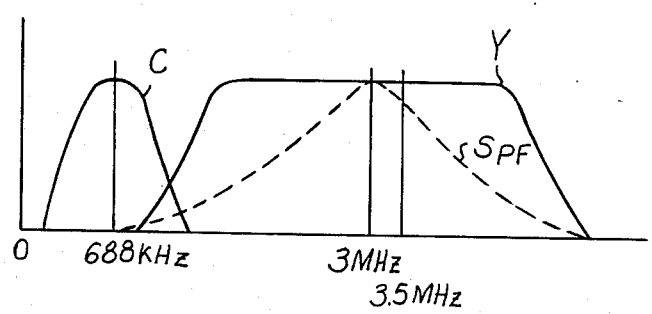
FIG. 6 is a graphical representation of the frequency spectrum of the sequence recorded by the embodiment shown in FIG. 4.

It is seen that the instantaneous frequency of the frequency-modulated signal is dependent upon whether the digital audio signal then is provided with a binary "1" or a binary "0". The frequency of the FM signal is switched at digital signal bit intervals between the frequencies $f_1$ and $f_2$, provided that the digital signal bit also changes. Encoder 102 may be selected such that the average frequency of the frequency-modulated digital audio signal is on the order of about 3 MHz. Preferably, the central frequency of the frequency-modulated digital audio signal is substantially equal to, or at least on the same order as, the central frequency of the frequency-modulated luminance component included in the video signals $S_v$. Consequently, the frequency spectrum of the video and audio signals recorded by the apparatus shown in FIG. 4 may be of the type graphically depicted in FIG. 6. The broken curve shown in FIG. 6 represents the frequency spectrum of the frequency-modulated digital audio signals $S_{pf}$; and, as shown, exhibits a central frequency of 3 MHz. Since the central frequency of the frequency-modulated digital audio signals $S_{pf}$ is substantially equal to the central frequency of the frequency-modulated luminance component of the video signals $S_v$, the phenomenon of azimuth loss is effective in avoiding, or at least minimizing, undesired cross talk from adjacent tracks during reproduction. Furthermore, the same equalizer and amplifying circuits may be used to reproduce the frequency-modulated digital audio signals as are used to reproduce the video signals.

Figure 7:
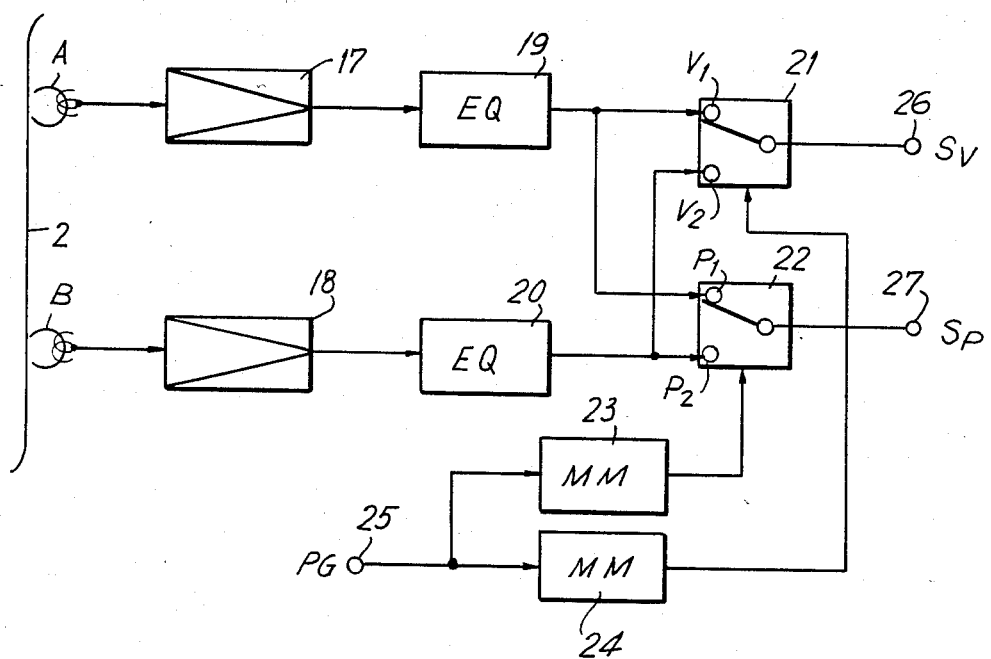
FIG. 7 is a block diagram of one embodiment of apparatus which reproduces the signals recorded by the embodiment shown in FIG. 4.

FIG. 7 illustrates apparatus for reproducing the signals that are recorded on the adjacent tracks $T_A$ and $T_B$ of tape 2. The previously recorded signals are reproduced by rotary heads which, in one embodiment, may comprise the very same heads that were used to record those signals, and in another embodiment, the heads may comprise separate reproducing transducers having azimuth angles equal to the azimuth angles of the respective recording heads. For convenience, the reproducing heads are designated heads A and B in FIG. 7, have the same azimuth angles as recording heads A and B, respectively, and are adapted to scan tracks $T_A$ and $T_B$, respectively. Of course, any cross talk components that may be picked up from track $T_B$ as head A scans tracks $T_A$ is avoided or at least minimized because of azimuth loss attenuation of the frequency modulated luminance component and the frequency-modulated digital audio signal, and because of comb filtering of the cross talk chrominance components.

Head A is coupled to an amplifier 17 and an equalizer 19, the output thereof being coupled to a video input $V_1$ of a change-over switch 21 and to an audio input $P_1$ of change-over switch 22. Similarly, head B is coupled to an amplifier 18 and an equalizer 20, the output thereof being coupled to another video input $V_2$ of change-over switch 21 and to another audio input $P_2$ of change-over switch 22. The outputs of change-over switches 21 and 22 are coupled to video and audio outputs 26 and 27, respectively. Change-over switch 21 is controlled by a video signal switch pulse produced by a monostable multivibrator 24; and change-over switch 22 is controlled by an audio signal switch pulse produced by monostable multivibrator 23. As illustrated, monostable multivibrators 23 and 24 are triggered in response to position pulses PG supplied to a terminal 25, this terminal being coupled to both monostable multivibrators. A position pulse PG is produced when head A (or head B) rotates to a predetermined position, such as position c (FIG. 2). Thus, the position pulses PG may be produced by the same position pulse generator circuitry that has been described above with respect to FIG. 4.

In operation, as heads A and B scan alternate tracks $T_A$ and $T_B$, respectively, the frequency-modulated digital audio signals and the video signals recorded in each track are reproduced by their respective heads. After suitable amplification and equalization, as is conventional, the reproduced signals are supplied to change-over switches 21 and 22. In particular, the output of head A is coupled to video input $V_1$ of change-over switch 21 and to audio input $P_1$ of change-over switch 22. Likewise, the output of head B is coupled to video input V₂ of change-over switch 21 and to audio input P₂ of change-over switch 22. Let it be assumed that position pulses PG are generated when head A rotates to position c. Let it be further assumed that monostable multivibrator 23 is triggered in response to the position pulses to generate an audio signal switch pulse of predetermined duration. Furthermore, monostable multivibrator 24 is responsive to the position pulses PG to produce video signal switch pulses, also of a preset duration, but timed to occur upon the termination of the audio signal switch pulse produced by monostable multivibrator 23. It is appreciated, therefore, that monostable multivibrator 24 may include a suitable delay circuit such that the monostable multivibrator is triggered substantially at the same time that the audio signal switch pulse produced by monostable multivibrator 23 terminates.

When head A rotates to position c, monostable multivibrator 23 supplies the audio signal switch pulse to change-over switch 22 such that audio input P₁ is coupled to output 27. Hence, since head A now is reproducing the frequency-modulated digital audio signals, these signals are coupled to output terminal 27 whereat the digital audio signal $S_p$ may be recovered. At this time, monostable multivibrator 24 does not produce an output pulse and, consequently, change-over switch 21 couples video input V₂ to output 26. Hence, the video signals reproduced from track $T_B$ by head B are supplied to output terminal 26 whereat the video signals $S_v$ are recovered.

The audio signal switch pulse produced by monostable multivibrator 23 terminates at a predetermined time. The termination of this audio signal switch pulse coincides with the rotation of head A to position d. Coincidentally therewith, monostable multivibrator 24 supplies the video signal switch pulse to change-over switch 21. Hence, change-over switch 21 now couples the video input V₁ to output terminal 26; and upon the termination of the audio signal switch pulse, change-over switch 22 couples the audio input P₂ to output terminal 27. Thus, the video signals reproduced by head A from track $T_A$, commencing at position d, now are supplied to output terminal 26. At this time, however, head B is not in contact with tape 2. Thus, although change-over switch 22 couples the audio input P₂ to output terminal 27, no signals are supplied to this audio output terminal.

When head B rotates to position c, frequency-modulated digital audio signals are reproduced thereby, and these signals now are supplied to the audio output terminal 27 via change-over switch 22.

The video signal switch pulse produced by monostable multivibrator 24 terminates at a predetermined time. The termination of this video signal switch pulse coincides with the rotation of head B to position d. Therefore, as head B now reproduces the video signals from track $T_B$, these video signals are coupled via change-over switch 21 to the video output terminal 26.

The foregoing operation continues such that the respective change-over switches are operated alternately, thereby separating the audio and video information signals that are reproduced from successive tracks $T_A$ and $T_B$. The separated signals are provided at video and audio output terminals 26 and 27, respectively, and further processing circuitry (not shown) is coupled to these terminals so as to process the separated video and audio information. For example, a frequency demodulator may be coupled to audio output terminal 27 to recover the original digital audio signals. These digital audio signals then may be decoded and reconverted back to analog form.

While the present invention has been particularly shown and described with reference to a preferred embodiment, it will be readily appreciated to those of ordinary skill in the art that various changes and modifications in form and details may be made without departing from the spirit and scope of the invention. For example, the teachings of the present invention find ready application to the recording of frequency-modulated digital information signals throughout an entire track. Thus, the present invention may be used to record general information signals, not necessarily limited solely to digital audio signals, in an entire record track. Each track need not be separated, as described above, into video and audio segments. It is intended that the appended claims be interpreted as including the foregoing as well as other similar changes and modifications.

What is claimed is:

1. A method of recording first and second information signals in adjacent parallel tracks on a record medium, said first information signal having frequency modulated components and said second information signal being an analog signal, comprising the steps of:
   digitizing said second information signal to produce an encoded digital signal representative thereof having a preselected frequency;
   producing frequency modulated signals from said encoded digital signal, whereby said frequency modulated signals have an instantaneous frequency which is one of two selected frequencies based on the state of the encoded digital signal and has a frequency spectrum, the central frequency of which, is substantially equal to the central frequency of said frequency modulated components of said first information signal; and
   recording said frequency modulated signals in alternate tracks with alternate recording heads, said alternate recording heads having air gaps of different azimuth angles.

2. The method of claim 1 wherein said digital signals are formed of binary "1"s and "0"s; and said step of producing frequency modulated signals comprises generating a signal of a first frequency in response to a binary "1" and generating a signal of a second frequency in response to a binary "0".

3. The method of claim 2 wherein each of said first and second frequencies is sufficiently high that a signal of one frequency recorded by one of said recording heads is substantially attenuated due to azimuth loss if reproduced by a playback head having the same azimuth as the other recording head.

4. The method of claim 1 wherein said information is audio information, and the frequency modulated signals are recorded in predetermined portions of said tracks.

5. The method of claim 4 further comprising the step of recording video signals in the remaining portions of the same tracks in which said frequency modulated signals are recorded by the same alternate recording heads used to record said frequency modulated signals.

6. A method of recording both video and audio signals in common tracks on a record medium, said video signals including frequency modulated components, comprising the steps of:
   digitizing said audio signals to produce encoded digital audio signals representative thereof and having a predetermined frequency;

producing frequency modulated signals from said encoded digital audio signals that have a frequency which is either one of two different frequencies, in response to the logic state of said encoded digital audio signals and that have a frequency spectrum based on said selected frequency of said digital signal with a central frequency substantially equal to the central frequency of said frequency modulated components of said video signal;

recording said frequency modulated signals in predetermined portions of alternate tracks with alternate recording heads having air gaps of different azimuth angles; and recording said video signals in the remaining portions of said alternate tracks with said alternate recording heads.

7. The method of claim 6 wherein said recording heads are rotary heads and further comprising the steps of switching each of said heads to receive said frequency modulated signals when each head rotates to a predetermined position, and at a predetermined time thereafter switching said head to receive said video signals.

8. The method of claim 6 wherein said digital signals are formed of binary "1"s and "0"s; and wherein said step of producing frequency modulated signals comprises generating a first frequency in response to each binary "1" and generating a second frequency in response to each binary "0".

9. A system for recording first and second information signals in adjacent parallel tracks on a record medium, said first information signal having frequency modulated components, and said second information signal being an analog signal, comprising:

at least two rotary recording heads having air gaps of different azimuth angles and rotatable to trace parallel adjacent tracks on said record medium;

digitzing means for digitizing said second information signal to produce encoded digital signals representative thereof at a selected frequency;

frequency modulating means for producing frequency-modulated signals in response to said encoded digital signals and having a first or second frequency which is a function of the logic state of said encoded digital signals and a frequency spectrum determined by said selected frequency of said encoded digital signals with a central frequency substantially equal to the central frequency of said frequency modulated components of said first information signal; and supply means for supplying said frequency-modulated signals alternately to said heads for recording in alternate tracks.

10. The system of claim 9 wherein said digital signals are formed of binary "1"s and "0"s; and wherein said frequency modulating means comprises means for producing a signal of a first frequency in response to a binary "1" and means for producing a signal of a second frequency in response to a binary "0".

11. The system of claim 10 wherein said frequency modulating means comprises a first frequency source; a second frequency source; and selecting means responsive to said binary "1" to select said first frequency source to produce said signal of said first frequency and responsive to said binary "0" to select said second frequency source to produce said signal of said second frequency.

12. The system of claim 9 further comprising a source of video signals; said supply means being coupled to both said source and said frequency modulating means; and control means for controlling said supply means to supply said frequency-modulated signals to one head for a predetermined time interval while concurrently supplying said video signals to the other head, whereby said frequency-modulated signals are recorded in a predetermined portion in each track and said video signals are recorded in the remainder of said track.

13. The system of claim 12 wherein said heads are spaced apart by substantially 180°, and each head scans a track having an arcuate length of $180° + \theta$.

14. The system of claim 13 wherein said frequency-modulated signals are recorded in the arcuate length $\theta$ of a track.

15. The apparatus of claim 12 wherein said supply means comprises first and second switch means coupled to respective ones of said heads, each switch means being coupled to both said source and said frequency modulating means; and said control means comprises pulse generating means for supplying a first control pulse of predetermined duration to said first switch means when one of said heads rotates to a predetermined location for coupling said first switch means to said frequency modulating means during said first control pulse duration and for supplying a second control pulse of predetermined duration to said second switch means when the other of said heads rotates to a predetermined location for coupling said second switch means to said frequency modulating means during said second control pulse duration, whereby the frequency modulated signals are recorded during each pulse duration and the video signals are recorded at other times.

16. The system of claim 15 wherein each of said switch means includes a first input coupled to said frequency modulating means, a second input coupled to said source of video signals, an output coupled to a respective head, and means responsive to said control pulse for interconnecting said first input with said output and, in the absence of said control pulse, for interconnecting said second input with said output.

17. The system of claim 12 wherein said information signals are audio signals; and wherein said digitizing means includes time compression means for time-compressing the digitized audio signals.

18. The system of claim 12 further comprising at least two rotary playback heads having air gaps of the same respective azimuth angles as said recording heads for reproducing the frequency-modulated and video signals from each track; and separating means coupled to said playback heads for separating the reproduced frequency-modulated and video signals for separate processing.

19. The system of claim 18 wherein said separating means comprises video signal switch means having inputs coupled to said playback heads and outputs coupled to a video output and frequency-modulated signal switch means having inputs coupled to said playback heads and outputs coupled to an information output; and switch pulse generating means for generating a video signal switch pulse of predetermined duration to condition said video signal switch means to couple one of said playback heads to said video output when one of said playback heads rotates to a first location along a track and on the termination of said video signal switch pulse to couple the other playback head to said video output, said switch pulse generating means generating an information signal switch pulse of predetermined duration to couple one of said playback heads to said information output when one of said playback heads rotates to a second location along a track and on the termination of said information signal switch pulse to couple the other playback head to said information output.

20. The system of claim 19 wherein said switch pulse generating means comprises a pulse generator for sensing when one of said playback heads rotates to a predetermined position to produce a trigger pulse; and first and second monostable multivibrator neans responsive to said trigger pulse to generate said video and information signal switch pulses, respectively.

21. A system for recording both video and audio signals in common tracks on a record medium, comprising:
first and second rotary heads having air gaps of different azimuth angles and rotatable to trace parallel adjacent tracks on said record medium;
a source of video signals having a frequency converted chrominance component exhibiting a substantially low center frequency and a frequency modulated luminance component exhibiting a substantially higher center frequency relative to said low center frequency of said chrominance component;
a source of audio signals;
digitizing means for digitizing said audio signals to produce digital audio signals containing substantially low frequency components;
frequency modulating means for producing frequency modulated signals having an instantaneous frequency which is a function of the contents of said digital audio signals and a central frequency substantially equal to said central frequency of said frequency modulated luminance components, whereby said low frequency components of said digital audio signals are eliminated; and
supply means for supplying said frequency modulated signals and said video signals, in relative succession to each other, alternately to said first and second rotary heads.

22. The system of claim 21 wherein both of said rotary heads are in recording contact with said record medium concurrently for a predetermined portion of the respective traces thereof; and wherein said supply means supplies said frequency modulated signals to one of said heads during said predetermined portion of the respective trace thereof while concurrently supplying said video signals to the other head.

23. The system of claim 22 wherein said frequency modulated signals are recorded during the beginning portion of each trace of said heads followed by said video signals.

24. The system of claim 22 wherein said video signals include at least a frequency-modulated luminance component, and wherein the central frequency of said frequency modulated signals is approximately equal to the central frequency of said at least frequency-modulated luminance component.

25. The system of claim 21 wherein said digitizing means includes analog-to-digital converting means for converting said audio signals to encoded digital signals, and time compression means for time-compressing said encoded digital signals.

26. The system of claim 21 wherein said supply means comprises first and second switch means each having an output coupled to a respective head and a pair of inputs coupled respectively to said frequency modulating means and to said source of video signals; and switch control means responsive to the rotation of at least one head to a predetermined location to control each of said switch means to couple said frequency modulating means to a respective head for a predetermined portion of the trace thereof and to couple said source of video signals to said respective head for the remaining portion of said trace.

* * * * *